Figure 11:
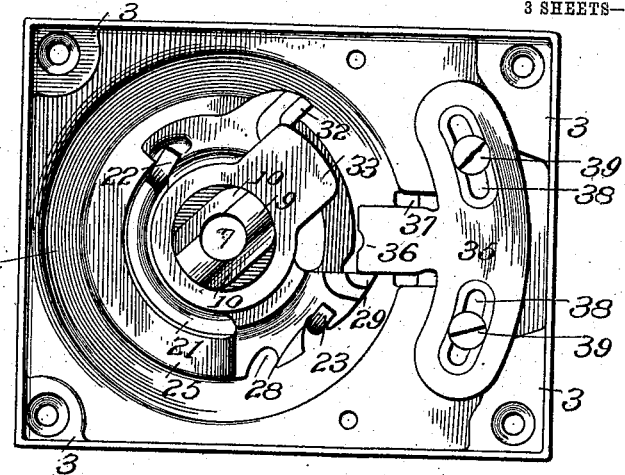

No. 815,011. PATENTED MAR. 13, 1906.
S. HANSON.
FLOOR HINGE.
APPLICATION FILED NOV. 23, 1904.
3 SHEETS—SHEET 1.
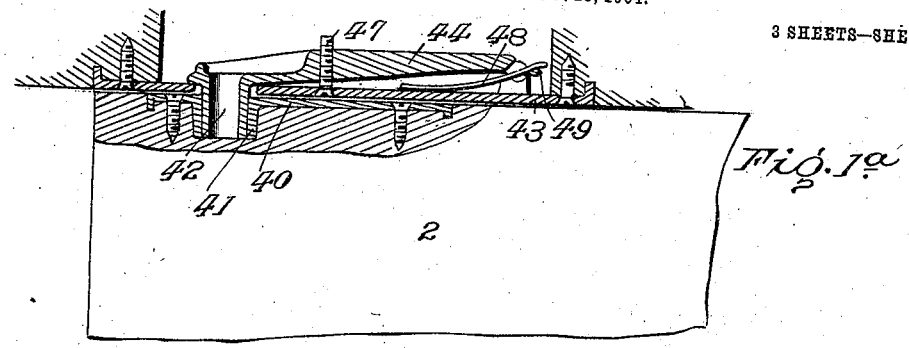
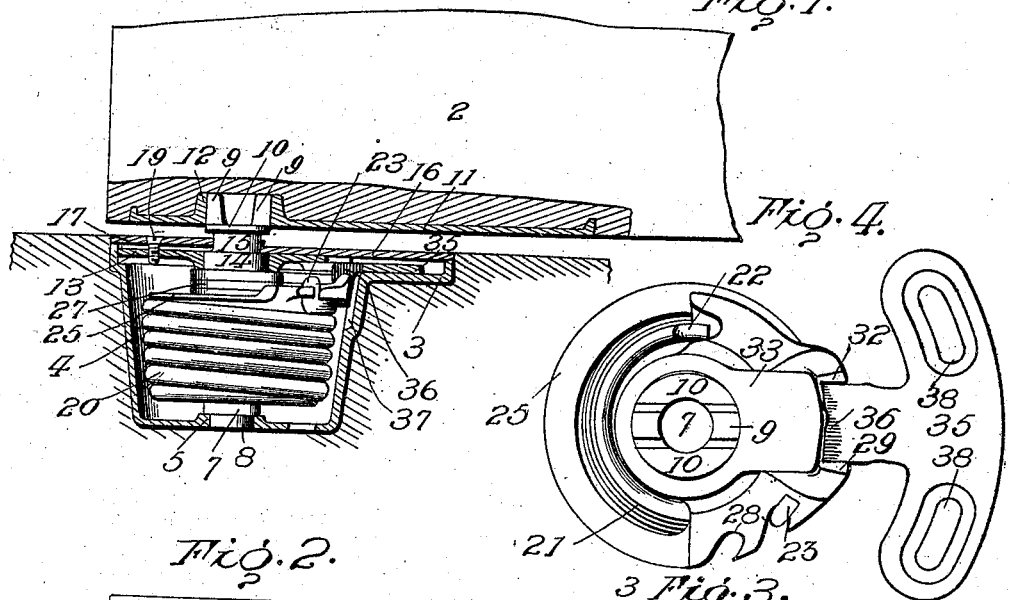
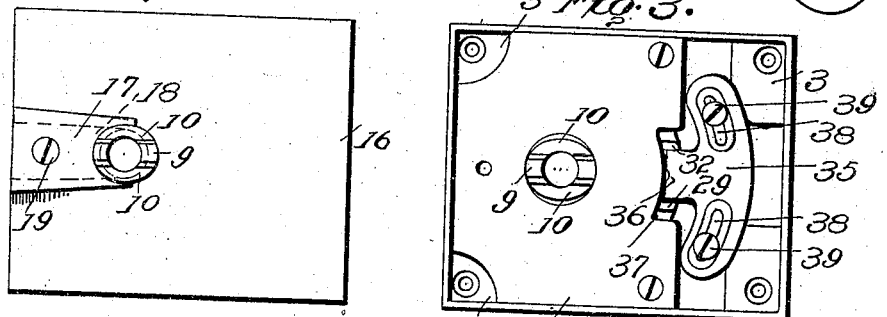
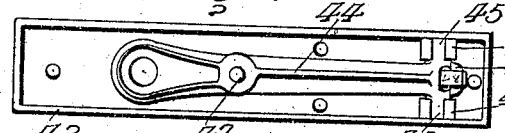
Witnesses
Inventor
Sig. Hanson
Attorney No. 815,011. PATENTED MAR. 13, 1906.
S. HANSON.
FLOOR HINGE.
APPLICATION FILED NOV. 23, 1904.
3 SHEETS—SHEET 2.
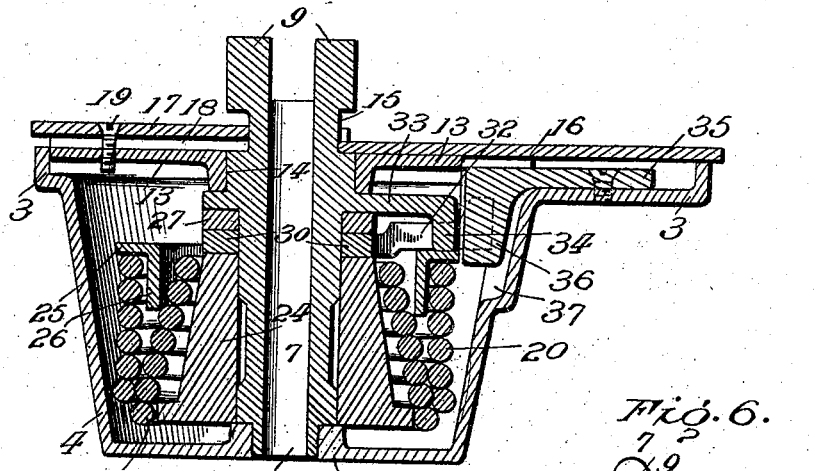
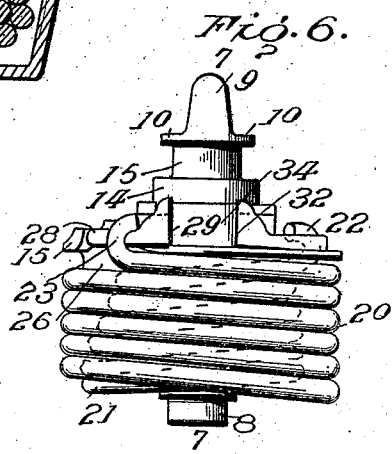
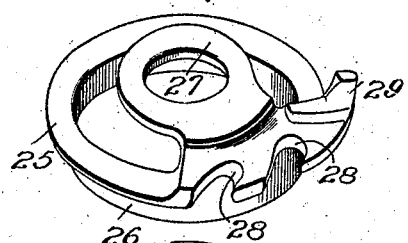
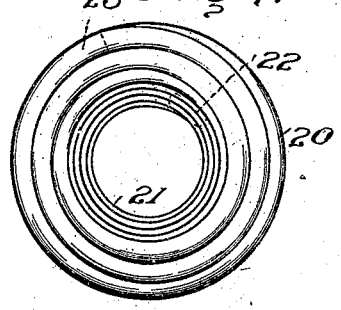
Witnesses
Jno. Inniu
E. R. Peck
Inventor
Sig. Hanson
By Hubert E. Peck
Attorney No. 815,011. PATENTED MAR. 13, 1906.
S. HANSON.
FLOOR HINGE.
APPLICATION FILED NOV. 23, 1904.

3 SHEETS—SHEET 3.

Witnesses
Jno. ?
E. R. Peek

Inventor
Sig. Hanson
By Hubert E. Peak
Attorney

UNITED STATES PATENT OFFICE.

SIGVART HANSON, OF RACINE, WISCONSIN.

FLOOR-HINGE.

No. 815,011.　　　　Specification of Letters Patent.　　　Patented March 13, 1906.

Application filed November 23, 1904. Serial No. 234,071.

*To all whom it may concern:*

Be it known that I, SIGVART HANSON, a citizen of the United States, residing at Racine, Racine county, State of Wisconsin, have invented certain new and useful Improvements in Floor-Hinges; and I do hereby declare the following to be a full, clear, and exact description of the invention, such as will enable others skilled in the art to which it appertains to make and use the same.

This invention relates to certain improvements in hinges for swinging doors or the like.

An object of the invention is to provide certain improvements in floor-hinges whereby the floor-plate is normally held fixed in position, yet can be readily released and slipped laterally from the hinge box or casing without removing the door nor disturbing or disarranging the operative parts of the hinge.

Another object of the invention is to provide certain improvements in double-acting floor-hinges whereby the normal or inactive position of the hinge-pintle or operative parts of the hinge is or are determined or controlled by a single center stop or abutment.

Another object of the invention is to provide improvements in double-acting floor-hinges whereby the opposing spring-holders are arranged at one end of the spring and coöperate with one center stop or abutment and both coöperate with one member or part rigid with the pintle.

Another object of the invention is to provide improvements in double-acting floor-hinges whereby means readily accessible at the top portion of the hinge can be adjusted to vary or change the normal or inactive position of the hinge-pintle through the medium of improved mechanism.

Another object of the invention is to provide improvements in double-acting spring floor-hinges whereby the adjustment of the hinge to vary or control the normal or inactive position of the hinge parts can be effected from the top of the hinge when set up by a very simple operation without removing any of the parts of the hinge except the floor-plate.

A further object of the invention is to provide certain improvements in spring floor-hinges whereby the operative parts of the hinge when set up can be easily adjusted without taking down the door to vary the normal or inactive position of the door, so that the hinge can be readily set after the door has been mounted thereon to yieldingly hold the door in a certain normal or closed position with respect to the door-jamb or other parts adjacent to the door.

A further object of the invention is to provide an exceedingly simple, durable, and effective spring floor-hinge comprising a minimum number of parts as compared with the functions performed so arranged as to attain a maximum efficiency.

A further object of the invention is to provide an improved form and arrangement of spring for floor-hinges whereby the hinge is rendered exceedingly compact and effective in controlling the door.

A further object of the invention is to provide certain improvements in combinations, constructions, and arrangements of parts whereby a highly-efficient upper hinge will be produced for swinging doors.

The invention consists in certain novel features of construction and in arrangements or combinations of parts, as more fully and particularly described and set forth hereinafter.

Figure 12:
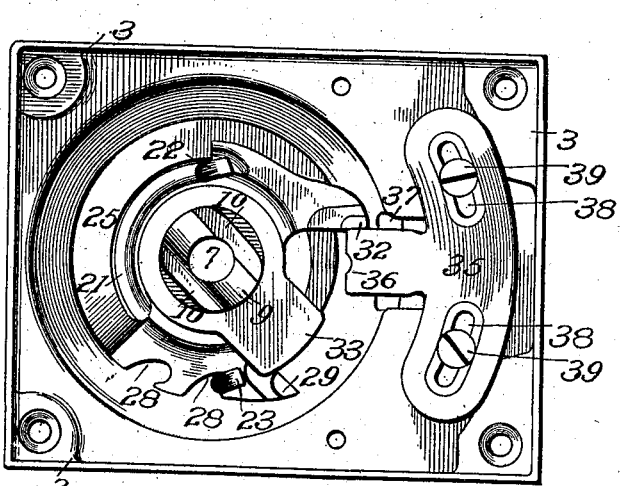
Figures 13, 14:
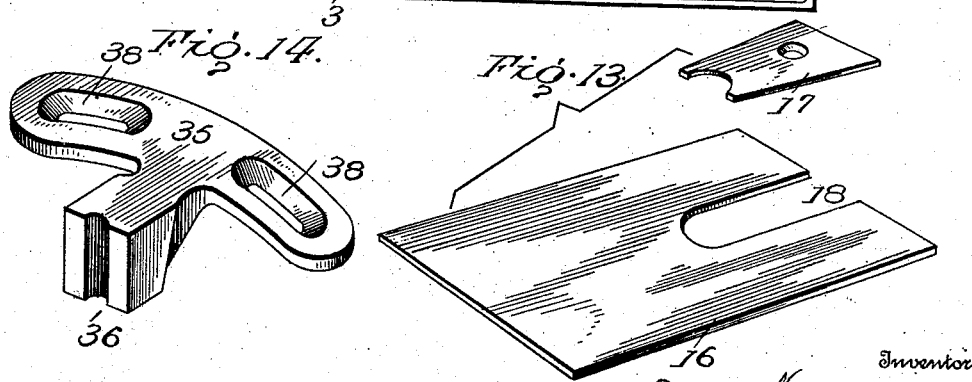

Referring to the accompanying drawings, which show merely for purposes of explanation and illustration a preferred form as an example from among other constructions within the spirit and scope of my invention, Figure 1 is a vertical central section through the floor-spring casing, taken in the plane of the door and showing a portion of the door and the socket-plate secured in the lower edge of the door and having the socket fitted on the shouldered upper end of the hinge-pintle. Fig. 1$^a$ shows the upper portion of a door partially broken away, the upper hinge for the door being shown in section. Fig. 1$^b$ is a detail top plan view of the upper hinge. Fig. 2 is a top plan view of the floor-hinge with the floor-plate in position. Fig. 3 is a top plan view of said hinge, the floor-plate and its clamp being removed. Fig. 4 is a plan view of the working parts of the hinge and center stop or abutment assembled, the under cover and floor plates and the casing being removed. Fig. 5 is a vertical section taken centrally through the hinge, showing the parts in normal position. Fig. 6 is a detail side elevation of the spring with the pintle and spring-holders all properly assembled. Fig. 7 is a detail bottom plan view of the hinge detached. Fig. 8 is a detail perspective view of one of the spring-holders. Fig. 9 is a detail perspective of the other spring-holder. Fig. 10 is a detail perspective of the pintle. Fig. 11 is a top plan view of the hinge, the floor and under cover plates being removed, the parts shown in the positions assumed when the door is open. Fig. 12 is a similar view, but showing the parts in the positions assumed when the door is swung in the opposite direction. Fig. 13 is a detail perspective view of the floor-plate and its clamp, the clamp shown separated from said plate. Fig. 14 is a detail perspective view of the adjustable center stop or abutment.

In the drawings, 2 is the door carried by a bottom double-acting spring floor-hinge and by an upper hinge, so that the door can swing open in either direction. My invention relates particularly to the type of swinging-door hinges comprising floor-hinges which are set down in the floor and comprise an oscillating spring-controlled vertical pintle on which the door rests and which turns with the door and is arranged with coöperating parts to yieldingly hold the door in its normal closed position and to return the door to such closed position after the same has been swung in either direction from that position. The floor-hinge casing comprises a usually depressed top base-plate 3, adapted to be securely seated in a recess in the floor, and the depending cup or socket 4, the bottom or floor of which is formed with a step or bearing 5 for the lower end of the pintle 7. This pintle is arranged vertically and about concentrically within said cup or socket and at its shouldered lower end rests on the floor of the cup and is provided with the reduced end or journal 8, fitting and turning in said bearing 5. The pintle projects upwardly above the casing or frame and the top plates thereon and is provided with the upper end tenon 9 and the shoulders 10, having flat upper faces at the lower end of the tenon. The door at its lower edge has a plate 11 rigidly secured therein, and this plate is formed with a vertical socket 12, formed to receive the tenon 9 of the pintle, whereby the plate 11 rests on the shoulder 10 with the tenon 9 fitted in the socket. The door is thus supported by the pintle, and the pintle turns with the door, yet the door when the upper hinge is properly adjusted can be lifted free from the pintle or fitted down thereon.

The perforated plate 13 forms the under cover approximately closing the otherwise open casing and provides an upper bearing for the pintle. This plate fits and is removably secured in the top plate 3 by screws or other suitable means. The pintle is formed with the journal portion 14 snugly fitting and turning within the bearing portion or opening of the plate 13, and the head 9 of said pintle is of slightly less diameter than said journal portion to permit the plate 13 to be readily placed thereon.

The pintle is preferably reduced annularly at 15 above the journal 14 and below the shoulders 10 to receive the top cover or floor plate 16 and the clamping-plate 17 thereof. The top cover or floor plate 16 is of a size to rest on the top edges of the top plate 3 of the casing, and in order to permit ready removal of said floor-plate 16 I form the same with a longitudinal slot 18, extending through an end edge thereof and having a rounded inner end to receive the annular reduced portion 15 of the pintle, so that the plate can slide into place on the casing, said slot receiving the pintle until the curved inner end wall of the slot fits in the said annularly-reduced portion 15 of the pintle. This floor-plate is removably held in place by suitable means. For instance, I show the clamp-plate 17 removably resting on the inner end of the plate 16 along both edges of the slot in said plate and covering said slot and having the notched inner end fitting in the reduced portion 15 of the pintle. This plate can be locked down on and clamp the plate 16 in position by a screw 19, passed down through the clamp-plate and into the plate 13. The floor-plate 16 can hence be readily removed to permit adjustment of parts of the hinge and for oiling by loosening said screw holding the clamp-plate 17. The floor-plate 16 can be readily placed and locked in proper position after the hinge has been adjusted as desired. The floor-plate and its clamp fit around the pintle within the reduced portion 15 and form an effective closure, which can be readily removed and replaced without taking down the door or disturbing or dismantling the operative parts of the hinge.

I preferably control the oscillation of the pintle by a single double-acting spring fitted within the cup or socket of the casing and within which the pintle is about concentrically arranged. I employ a double-coiled spring formed of a single length of wire coiled to form the outer approximately cylindrical portion 20 and the inner tapered portion 21 approximately in the form of a truncated cone and arranged about concentrically within the outer portion and of approximately the same vertical length or height as the outer portion, said inner and outer portions of the spring being joined together or merging into each other at their lower ends, and the diameter of the inner portion being less than that of the outer portion, preferably so as to leave the annular space between said inner and outer portions. The two ends of the single wire length forming said two portions of the spring are arranged at the upper ends of said portions. The terminal end of the wire forming the inner portion of the spring is bent, as at 22, to form an attaching-hook, while the terminal end of the wire forming the outer portion is bent, as at 23, to form an oppositely-facing hook to engage the respective spring-holders, as hereinafter more fully explained. A sleeve 24 is located on the pintle and fitted within the inner portion of the spring and having its lower end flared outwardly or enlarged to form a spring-guard at the lower end of the spring for maintaining the same properly centered and positioned with respect to the pintle. A shouldered spring-holder is provided for each spring-terminal end 22 23. The holder for the outer spring-terminal 23 is in the form of a ring 25, arranged on top of the outer portion of the spring and formed with an annular vertical or depending flange 26, fitting within the upper end of the outer portion of the spring and around the upper end of the inner portion of the spring, thus forming an upper spring-guard or centering device. This ring is formed with an inwardly-extending arm or a center hub 27, fitting loosely on the pintle. This ring is also formed with one or more hooks or notches 28 to receive the hooked terminal end 23 of the spring, so that the tension of the spring is constantly on said spring-holder to oscillate the same in a certain direction. This spring-holder is formed with the radially-projecting end or shoulder 29. The spring-holder for the opposite end 22 of the spring has the inner hub 30, loosely receiving the pintle, and with the notch 31, receiving the terminal end 22 of the spring. This spring-holder at its outer portion rests on the ring 25 of the opposite spring-holder and is formed with the outwardly-projecting end or shoulder 32, normally arranged opposite, adjacent to, and in about the same plane with the corresponding shoulder 29 of the opposite spring-holder. The opposite spring ends constantly tend to oscillate these two spring-holders in opposite directions on the pintle as an axis—that is, the two opposing spring-holders oscillate on the same axial line and the shoulders 29 32 press in opposite directions, and hence constantly tend to come together. However, said shoulders are held apart and separated by a part of or part rigid with the pintle, so that the pintle is held by said shoulders in its normal inactive or central position. For instance, I show the pintle formed or provided with a lateral or crank arm 33, rigid therewith or forming a part thereof, and at its free end having a depending lug or projection 34 arranged between the two shoulders 29 32. The spring controls the pintle through the medium of this crank-arm and the spring-holders, and the pintle is yieldingly held in its normal position by the opposing engagement and pressure of said two shoulders 29 32 against said arm 33. By thus arranging the spring-holders with their free ends or shoulders in opposition or juxtaposition I am enabled to employ a single center stop or abutment acting on both spring-holders. The center stop or abutment can be attached to any suitable part or member of the casing, can be formed in any suitable manner, and any suitable means or arrangement can be provided for adjusting the same. Merely as an example of means which can be employed to form the abutment I show a plate 35, resting on the forward portion of the floor of the top plate 3 in advance of and not covered by the plate 13. This plate 35 has a horizontally and rearwardly extending arm having an enlarged free end or head 36 forming the center stop or abutment. Said arm extends rearwardly to the socket 4, and said abutment depends in a recess 37 in the vertical wall of the socket, the vertical edge walls of the recess limiting the lateral adjustment of the abutment or center stop. The center stop 36 is arranged in front of the crank-arm 33 of the pintle when the pintle is in its normal position, and the shoulders or free ends 29 32 of the spring-holders are extended rearwardly beyond arm 33 into normal engagement with the opposite side edges of said center stop, so that the center stop is between said shoulders or free ends and determines the normal or inactive position of the pintle and spring-holders.

Any suitable means can be employed to provide for the lateral adjustment of the center stop to vary the normal or inactive position of the pintle, and consequently to vary the normal or closed position of the door mounted on the pintle. As a mere example of adjusting means for this purpose I show the base or plate 35 normally secured rigidly to the plate 3 of the casing by clamping means which can be loosened to permit adjustment of the plate 35 along certain lines. For instance, I show the plate 35 formed with curved slots 38, the curvature of said slots being approximately struck from the axis of the pintle as a center. Clamping-screws 39 pass through the slots 38 and into the plate 3 of the casing, so that the plate 35 can be clamped tightly against plate 3 and held rigidly in position by tightening the screws 39. By loosening the screws 39 the plate 35 can be shifted laterally to carry the center stop or abutment to the right or left to correspondingly vary the normal or inactive position of the pintle. As the plate 35 is not covered by the under cover-plate 13, access to the screw 39 can be attained by loosening the clamp 17 and sliding the floor-plate 16 from the casing, so that the center stop can be readily adjusted without taking down or removing the door and without in any way dismantling the hinge. This is a feature of importance and great advantage, for after a door has been set up it is usually necessary to adjust the hinge to cause the door to assume a certain normally closed position with respect to the jamb or other adjacent parts. It is difficult to adjust the hinge so as to normally hold the door in a certain position unless the door is mounted on the hinge, or, in other words, unless the door is set up. However, I do not wish to limit my invention to the means here set forth for carrying and adjusting the center stop, as the center stop can be carried by other elements than a plate such as 35 and other means than what is herein set forth can be employed for adjusting said center stop.

I also do not wish to limit my invention to the specific form of spring shown, as the inner and outer portions of the spring can be otherwise formed than as shown in the accompanying drawings, and the inner springs guard or center device 24 is usually made to generally conform to the contour or general shape of the lower inner portion of the spring to hold the spring alined and against twisting out of shape with respect to the pintle.

The operation of the floor-hinge will be readily understood in the foregoing description by those skilled in the art without a detailed explanation. It is clear that when the door is swung in one direction the pintle turns with the door and the crank-arm 33 of the pintle will force one of the spring-holders away from the center stop, which stop holds the opposite spring-holder in position, so that when the door is released the tension of the spring will immediately act on the displaced holder to return the door to its normal position through the medium of the arm 33 and the pintle. If the door is swung in the opposite direction, the same action takes place through the medium of the opposite spring-holder, as will be seen by reference to Figs. 11 and 12.

I attain material advantages by forming the single spring in a double coil, as I thereby attain a direct pull on both spring-holders and also attain more power and strength than can be attained from a single coil-spring employing the same length of wire, and, furthermore, my form of spring occupies a minimum amount of space and is of a greatly increased elasticity and affords a maximum space above the spring for operating parts.

In Figs. 1ª and 1ᵇ I show my improved upper hinge, which is used in connection with my floor-hinge. 40 is a plate set in the top edge of the door and formed with the socket or bearing opening 41 to receive the pivot stud or pintle 42 of the upper hinge. 43 is the supporting plate or frame of the upper hinge, which is secured in the top frame above the door, a recess being formed in the frame above said plate 43 to accommodate the operating parts mounted on said plate. The pintle or stud 42 is carried by and preferably cast or otherwise formed in one piece with a lever 44, arranged longitudinally of and above the plate 43. At one end this lever is formed with the lateral trunnion 45, confined to turn in the bearing-lugs 46, extending upwardly from one end portion of plate 43. The lever 44 is fulcrumed at one end to the plate 43, so that the lever can be swung vertically. The opposite or free end of the lever is provided with the depending pivot-stud 42, which extends through an opening in plate 43 to enter the bearing-socket 41. 47 is a screw or threaded bolt which passes loosely through the plate 43, so as to turn freely therein and the threaded portion of which extends into a correspondingly-threaded hole in the lever 44 at a point between the fulcrum of the lever and the free end thereof. The head at the lower end of this screw 47 is so formed that the screw can be turned by a suitable instrument for the purpose of raising or lowering the lever 44. In order to hang the door, the screw 47 must be turned in a direction to elevate the lever 44 until the pivot-stud 42 has been withdrawn vertically until its lower end does not project below the plate 43. The door can then be placed in position on the pintle of the floor-hinge and with the bearing-socket 41 registering with the opening in the plate 43 in which the pivot-stud 42 is located. The door is then swung to one side, so as to expose the head of the screw 47, and said screw is turned to draw the lever 44 downwardly until the stud 42 projects the desired distance into the bearing-socket 41. It is obvious that the door can be released from the pivot-stud 42 by entire or partial withdrawal of the screw 47 to permit the upward movement of the lever and the withdrawal of said stud. For the purpose of causing the lever 44 to swing upwardly when the screw 47 is withdrawn I can, if desired, provide a suitable spring constantly tending to swing said lever upwardly. For instance, I show a plate-spring 48 bearing against the top surface of the plate 43, with one end extended upwardly through an opening in the fulcrumed end of the lever and bearing down on a projection 49 of the lever, arranged beyond the axis of the fulcrum on which the lever rocks. The spring being bowed from its normal straight line, thus constantly tends to rock the lever to elevate its free end carrying the pivot-plate. When the lever 44 is in the position shown by Fig. 1ª, with the pivot-stud 42 projected downwardly into operative position in the bearing-socket 41 of the door, the lever is held tightly against the plate 43 by the screw 47 and against the tension of the spring 48. To withdraw the pivot-stud 42 upwardly from operative position with respect to the socket 41, the screw 47 is turned to the left—that is, is unscrewed downwardly the necessary distance through the lever 44—and as said screw is moved down through the lever 44 the spring 48 rocks the lever, withdrawing the pivot-stud 42 upwardly from the bearing-socket 41 until the pivot-stud 42 moves upwardly beyond the bearing-socket 41 and through the opening in the plate 43. When the pivot-stud is in its withdrawn or inoperative position, the lever is rocked against the tension of spring 48 to project the pivot-stud downwardly to operative position by turnng the screw 47 to the right, and thereby drawing down the free end of the lever carrying the pivot-stud. It will hence be observed that the spring 48 rocks the lever to elevate the free end thereof carrying the pivot-stud as the screw is loosened and that this spring holds the head of the screw up against the under face of the plate 43. While I prefer to employ a spring constantly acting on the lever 44 to elevate its free end, and thereby withdraw the pivot-stud 42, yet I do not, as at present advised, wish to so limit all features of my invention as respects the upper hinge. This upper hinge is effective and durable in construction and reduces to the minimum the possibility of looseness of parts by reason of wear. When the lever is drawn down tightly against the plate, the pivot-stud and lever are held firm and solid.

It is evident that various changes and modifications might be resorted to in the forms, constructions, and arrangements of the parts described without departing from the spirit and scope of my invention. Hence I do not wish to limit myself to the exact constructions set forth.

What I claim is—

1. In spring-hinges, a double-acting spring formed of two coils one within the other with an intervening space, the coils merging together at one end of the spring, both coil ends or terminals being arranged at the opposite end of the spring.

2. In combination, a casing, a pintle rotatively mounted therein and having an arm projecting laterally therefrom, a double coiled spring having its terminals at the same end, spring-holders mounted on said pintle and normally in contact with opposite sides of said arm, said holders being in engagement, respectively, with said spring-terminals to actuate said pintle in either one of two directions, and means to maintain either holder in its normal position when said pintle is rotated to force the other holder from its normal position.

3. In combination, a casing, a pintle rotatively mounted therein and provided with a lateral arm, a double coiled spring having its terminals at its upper end, spring-holders in engagement, respectively, with said spring-terminals and normally engaging opposite sides of said arm to actuate said pintle in either one of two directions, an adjustable member having an abutment coacting with said holders, and adjustable securing means for said member, whereby the position of said abutment can be changed to vary the normal position of said pintle.

4. In combination, a casing, a pintle rotatively mounted therein, a coiled spring, a spring-centering sleeve within said spring and on said pintle, opposing spring-holders independent of said sleeve and mounted on said pintle and connected with spring-terminals, respectively, an abutment, and means whereby said spring-holders control said pintle to yieldingly hold the same in its normal position and actuate the same in either one of two directions.

5. In combination, a casing, a pintle rotatively mounted therein, a spring comprising two coils, one within the other, with their terminals at one end of the spring, spring-holders controlled by said spring and connected with said terminals, respectively, and means whereby said spring-holders yieldingy hold said pintle in its normal position, substantially as described.

6. A spring floor-hinge comprising in its construction, a casing, a pintle rotatively mounted therein and extending above the casing, spring-actuated mechanism within the casing controlling the movement of the pintle in one direction, in combination with a floor-plate slotted to receive the pintle and removable laterally from the pintle and casing and provided with securing means exterior of the casing and plate, whereby the floor-plate can be released and removed while the door is in place.

7. A double-acting spring floor-hinge comprising, in its construction, a casing, a vertical pintle rotatively mounted therein and projected upwardly to receive the door, and spring mechanism controlling the movement thereof in one direction, in combination with a floor-plate having a slot to receive the pintle, whereby the floor-plate can be slipped laterally from the casing and pintle, a clamping-plate to cover said slot and hold the floor-plate to the casing and securing means for said clamping-plate.

8. An upper hinge comprising a socket-plate adapted to be secured to the upper edge of the door, a plate having an opening therethrough and adapted to be secured to the frame above the door, a lever fulcrumed on said frame-plate and provided with a pivot-stud arranged in said opening, a spring acting on said lever to swing the same in one direction, and a screw passing through said frame-plate and engaging said lever to force the same in the opposite direction against the tension of said spring.

9. An upper hinge comprising a plate adapted to be secured to the frame above the door and provided with an opening therein, a vertically-swinging lever arranged at the top face of the plate and at its free end having a depending pivot-stud rigid therewith, said free end of the lever adapted to abut against the face of said plate, and a screw passing loosely through said plate and screwing into said lever between its ends, whereby the lever can be drawn by said screw down tightly against said plate with its stud depending below the same, and a socket-plate adapted to be secured to the upper edge of the door in place to engage said depending lever-stud.

10. An upper hinge comprising a plate adapted to be secured to the frame above the door having an opening therein and provided with bearing-lugs at its upper face, a lever arranged longitudinally above said plate and at one end having trunnions confined to oscillate in said lugs, the free end of said lever having a depending pivot-stud arranged to project downwardly through an opening in said plate, a screw having a headed lower end and passing loosely through said plate and screwing into said lever between its ends, and a socket-plate adapted to be secured to the upper edge of the door in place to engage the depending stud of the lever, substantially as described.

11. In spring-hinges, a casing, a pintle rotatively mounted therein and extended up to receive the door, and spring-controlling mechanism for said pintle comprising spring-coils, opposing spring-holders arranged above and coupled with the upper ends of said coils respectively, means whereby said holders control said pintle to yieldingly hold the same in its normal position and actuate the same in either one of two directions, and abutment mechanism for said holders, substantially as described.

12. In spring-hinges, in combination, a casing, a double coiled spring arranged therein and consisting of two coils merging together at one end and having opposing terminals at the opposite end, said coils arranged one within the other, and door-controlling mechanism arranged within said casing and connected with and controlled by said coils to yieldingly hold the door in its normal position and actuate the same in either one of two directions, substantially as described.

13. In a spring-hinge, in combination, a door-receiving pintle, spring-coils around said pintle, opposing spring-holders arranged on said pintle above and connected with said spring-coils, respectively, means whereby said holders control said pintle to yieldingly hold the same in its normal position and actuate the same in either one of two directions, and an abutment, one of said holders having a depending annular flange arranged between and spacing the upper ends of said coils, substantially as described.

14. In a spring door-hinge, in combination, a casing, a pintle rotatively mounted therein and projected upwardly to receive the door, spring-actuated pintle-controlling mechanism controlling the movement thereof in one direction, an under cover-plate arranged over said mechanism and forming the upper bearing for said pintle, and a sectional laterally-removable covering for said casing, said pintle projecting upwardly above said covering, said covering being laterally removable from said pintle while the door is thereon.

15. In a spring door-hinge, in combination, a casing having a depending cup, an under cover-plate over the cup, a removable floor-plate over the casing, a pintle rotatively mounted in the cup and having a top bearing in said under cover-plate and projecting above said floor-plate to receive the door, a spring on the pintle and in said cup, opposing spring-holders beneath said under cover-plate and controlled by said spring, means whereby said holders control said pintle to yieldingly hold the same in its normal position and actuate the same in either one of two directions, an adjustable center stop for said holders and arranged in said cup, and adjustable securing means for said center stop arranged beneath said floor-plate and readily accessible on the removal of said floor-plate.

In testimony whereof I affix my signature in presence of two witnesses.

SIGVART HANSON.

Witnesses:
GEORGE ELHOLM,
JOHN ROOD.